United States Patent [19]
Hagenah

[11] 3,796,110
[45] Mar. 12, 1974

[54] BICYCLE PEDAL WITH REFLECTORS

[75] Inventor: Hans-Gerhard Hagenah, Menden/Sauerland, Germany

[73] Assignee: Union Sils, van de Loo & Co., Frondenberg/Ruhr, Germany

[22] Filed: Jan. 7, 1972

[21] Appl. No.: 216,048

[30] Foreign Application Priority Data
Jan. 9, 1971 Germany............................ 2100825

[52] U.S. Cl. .............................................. 74/594.4
[51] Int. Cl............................................... B62m 3/12
[58] Field of Search ................................... 74/594.4

[56] References Cited
UNITED STATES PATENTS
2,315,380  3/1943  Yeater et al. ...................... 74/594.4
3,127,789  4/1964  Van De Loo ...................... 74/594.4
3,302,483  2/1967  Golden et al. ..................... 74/594.4

FOREIGN PATENTS OR APPLICATIONS
634,555  3/1950  Great Britain ..................... 74/594.4
807,545  1/1959  Great Britain .............. 74/594.4 UX Primary Examiner—Benjamin W. Wyche
Assistant Examiner—F. D. Shoemaker
Attorney, Agent, or Firm—Walter Becker

[57] ABSTRACT

A bicycle pedal having longitudinal sides provided with at least one opening in which at least one reflector is anchored and firmly held. The openings are so distributed over the longitudinal sides of the pedal as to permit mounting of the pertaining reflector selectively symmetrically or asymmetrically with regard to the transverse plane of symmetry of the pedal.

12 Claims, 17 Drawing Figures

PATENTED MAR 12 1974　　3,796,110

FIG.5
FIG.6
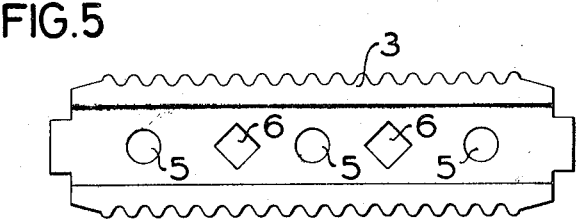
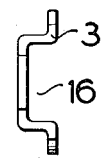
FIG.7
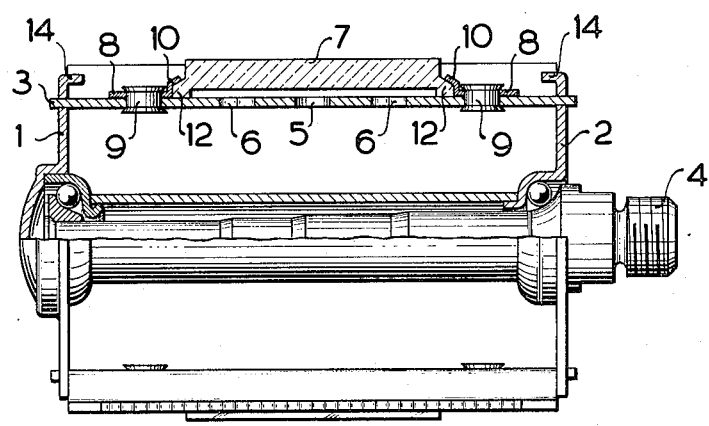
FIG.8
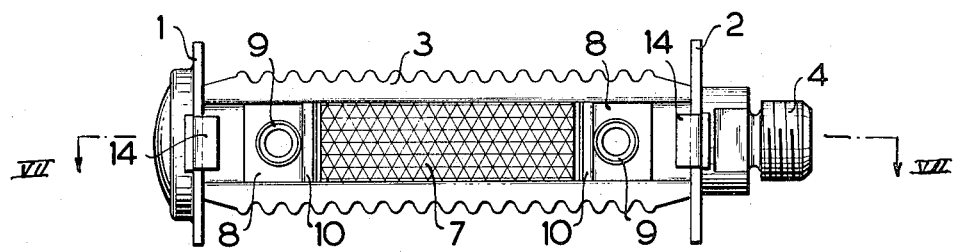

BICYCLE PEDAL WITH REFLECTORS

The present invention concerns a bicycle pedal with reflectors in which the reflector bodies are arranged on the longitudinal sides of the pedal. With bicycle pedals of this type the reflector bodies are well visible on the longitudinal sides of the pedal so that the light emanated by the headlights of vehicles is reflected and can be seen by the driver of the respective vehicle.

It is known to connect the reflector bodies by means of a box or frame in a detachable or non-detachable manner on the longitudinal sides of the pedals. Furthermore it is known to arrange the reflector bodies in recesses which are provided in the longitudinal sides of the pedals. With these pedals the reflector bodies can be arranged only in a predetermined manner on the longitudinal sides of the pedals.

It is an object of the present invention to simplify the mounting of the reflector bodies and to improve the possibility of arranging the reflector bodies on the longitudinal sides of the pedals.

This object and other objects and advantages of the invention will appear more clearly from the following specification in connection with the accompanying drawings, in which:

FIGS. 5 and 6 show a longitudinal side of a pedal according to the invention with a U-shaped cross section.

FIG. 7 represents a longitudinal section through a pedal with longitudinal sides of U-shaped cross section and with the reflector bodies arranged symmetrically, said section being taken along the line VII — VII of FIG. 8.

FIG. 8 is a side view of the pedal shown in FIG. 7.

Figure 1:
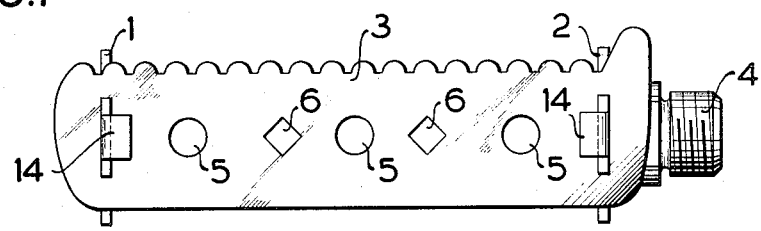
FIG. 1 is a side view of a sport pedal according to the invention with plane longitudinal sides.

The bicycle pedal with reflector means according to the invention in which the reflector bodies are arranged on the longitudinal sides of the pedal is characterized primarily in that the pedal has its longitudinal sides provided with bores and perforations for receiving connecting elements, the distance between the bores and perforations being adapted to the length of the reflector bodies in such a way that the reflector bodies may be connected to the pedal symmetrically as well as asymmetrically.

As connecting elements there may be employed holding means provided with tongues or plates or the like which engage the narrow sides of the reflector bodies. In order that when arranging the reflector bodies in pairs, one connecting element will suffice, holding means in the form of tongues or plates or the like are employed which have two tongues or the like extending in opposite direction with regard to each other. Preferably, the holding means are resilient and are provided with a formed-on extension for riveting.

In order to be able to mount the reflector bodies as closely as possible to the narrow side of the pedal, it is advantageous to form the connecting elements facing the narrow sides of the pedal from the side parts of the pedal.

Furthermore it is suggested according to the invention to secure the reflector bodies by formed-on extensions which engage the bores and perforations provided on the longitudinal sides of the pedal. In this way the reflector bodies are secured against lateral displacement.

A further possibility of preventing lateral sliding of the reflector bodies consists in that the reflector bodies are arranged in a U-shaped depression of the longitudinal sides of the pedal.

Referring now to the drawings in detail, the sport pedal shown therein comprises a pedal frame which includes two lateral parts 1 and 2 and two foot rests or tread strips 3, the frame being journalled in a manner known per se on the pedal axle 4.

As will be seen from FIG. 1, the two tread strips 3 have their longitudinal sides provided with bores 5 and perforations 6 which serve for receiving the connecting elements for the reflector bodies 7. The distance between the bores 5 and the perforations 6 is so selected with regard to the length of the reflector bodies 7 that the latter may be connected to the longitudinal sides of the pedal symmetrically as well as asymmetrically.

Figure 2:
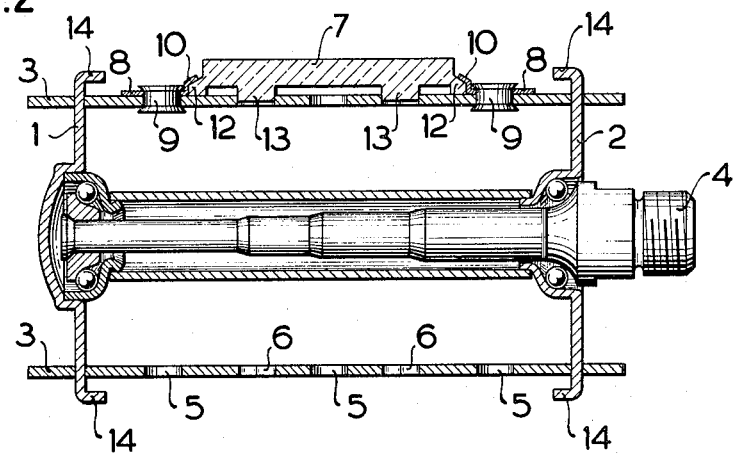
FIG. 2 is a longitudinal section taken along the line II — II of FIG. 3.
Figure 3:
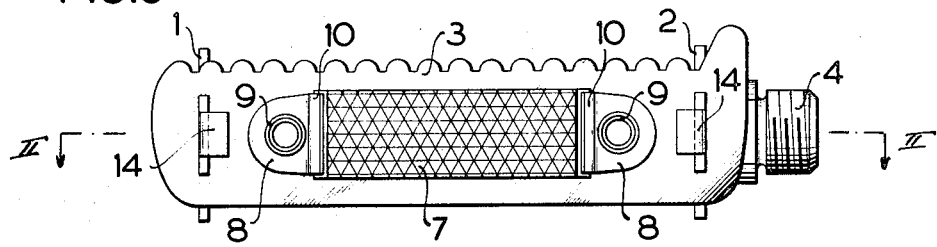
FIG. 3 is a side view of the pedal shown in FIG. 2.

With the pedal shown in FIGS. 2 and 3, the reflector bodies are arranged in the center of the longitudinal sides of the pedal and are by means of plate-shaped or link-shaped holding means 8 connected to the tread strips 3. As connecting elements preferably hollow rivets 9 are employed. By means of tongues 10 the holding means 8 engage a marginal portion 12 which is formed onto the reflector body 7 and press the reflector body 7 firmly against the outer surface of the tread strip 3. In order to prevent the reflector bodies from sliding, the reflector bodies have their back side provided with extensions 13 for engagement with the perforations 6.

Figure 4:
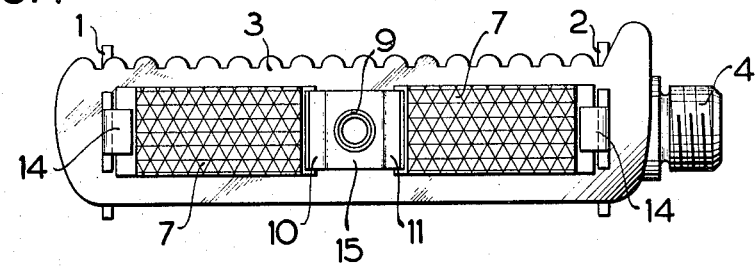
FIG. 4 shows the arrangement of the reflector bodies in pairs on the longitudinal sides of the pedal.
Figure 9:
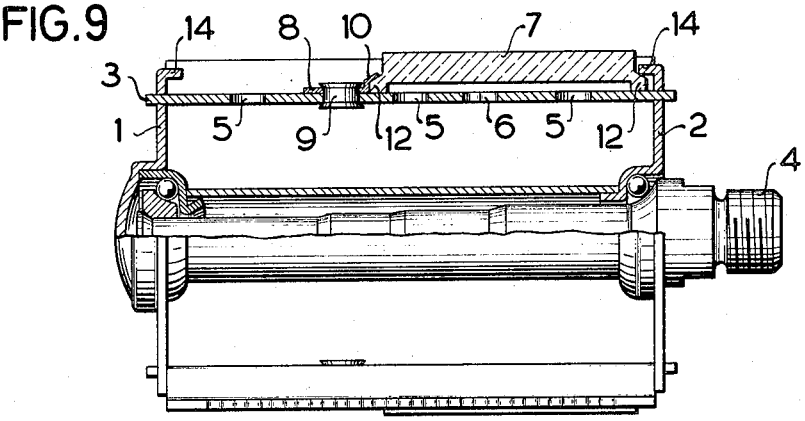
FIG. 9 is a longitudinal section through a pedal with a reflector body offset toward the crank side, said section being taken along the line IX — IX of FIG. 10.
Figure 10:
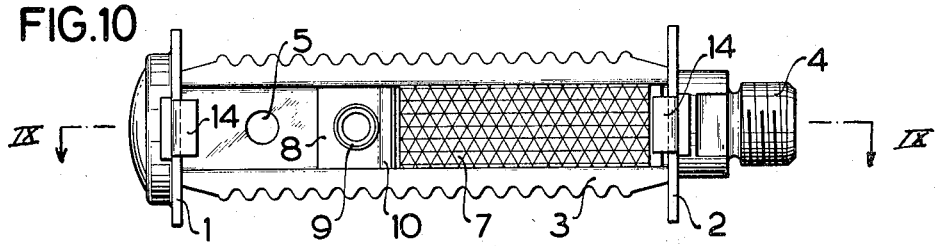
FIG. 10 is a side view of the pedal shown in FIG. 9.
Figure 11:
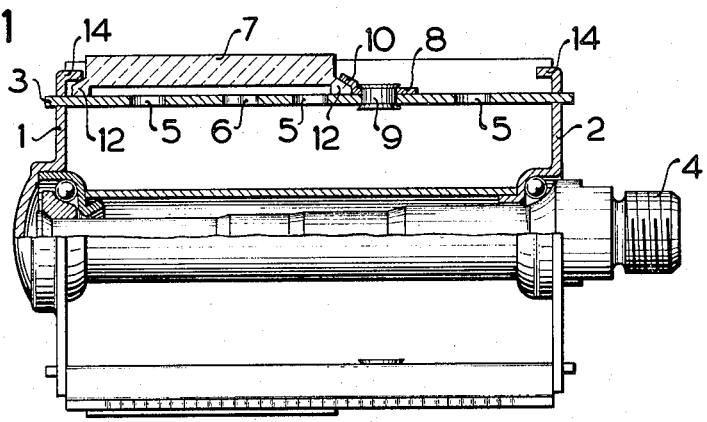
FIG. 11 is a longitudinal section through a pedal with a reflector body offset toward the front side, said section being taken along the line XI — XI of FIG. 12.
Figure 12:
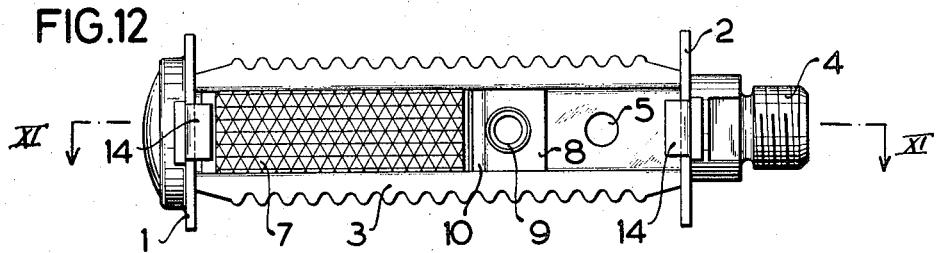
FIG. 12 is a side view of the pedal shown in FIG. 11.

FIG. 4 shows the arrangement of two reflector bodies 7 on the longitudinal sides of the pedal. The connection of the reflector bodies 7 is with this embodiment effected by connecting elements 14 which are formed out of the lateral portions 1, 2 and engage the outer narrow sides of the reflector bodies 7. The connection of the reflector bodies 7 is furthermore effected by means of a holding member 15 provided with two tongues 10 and 11. The holding means 15 engages those narrow sides of the reflector body 7 which are located in the center. The holding means 15 is by a hollow rivet 9 connected to the tread strip 3. As shown in FIGS. 5 and 6, the tread strips 3 may also be provided with a U-shaped depression 16 serving for receiving the reflector bodies 7. The reflector bodies 7 are so mounted as to be protected against damage from the outside. Moreover, the formed-on extensions 13 may be omitted because a lateral displacement is not to be expected. As shown in FIGS. 7 to 12, the reflector bodies 7 may with this pedal likewise be arranged in the center or laterally offset on the longitudinal sides of the pedal.

Figure 13:
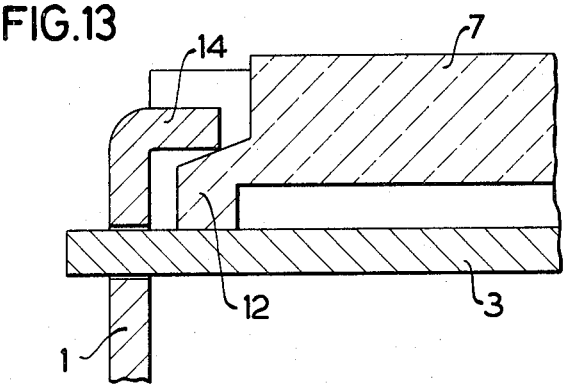
FIG. 13 illustrates on a larger scale than the preceding figures the connecting elements formed out of the side parts of the pedal according to the invention.
Figure 14:
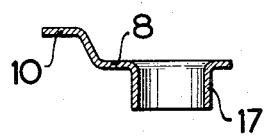
FIG. 14 is a cross section through a holding means provided with a formed-on set of rivets and a tongue.
Figure 16:
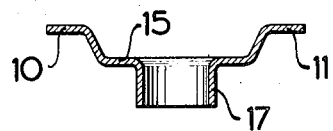
FIG. 16 is a cross section through a holding means provided with two tongues.
Figure 15:
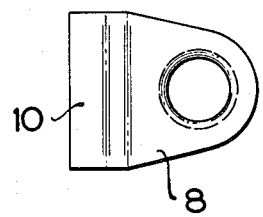
FIG. 15 is a top plan view of the holding means of FIG. 14.
Figure 17:
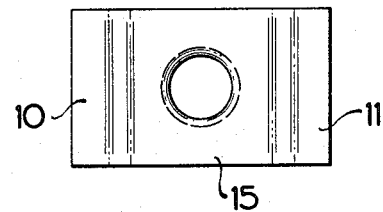
FIG. 17 is a top view of the holding means according to FIG. 16.

FIG. 13 shows how the connecting elements 14 formed out of the lateral parts 1 and 2 are to be designed with the pedal modifications described above. The holding means 8 and 15 for connecting the reflector bodies 7 are preferably designed resilient and as shown in FIGS. 14 to 17 are provided with formed-on extensions 17 for riveting. The holding means 8 is provided only with one tongue 10 whereas the holding means 15 has an additional tongue 11. In order to be able further to increase the reflecting effect of the pedal, the holding means 8 and 15 may be provided with a coat of reflecting material.

The advantages obtained by the present invention consist primarily in that the same pedal frame can be employed for various mountings of reflectors. In this way the keeping of stock will be simplified and additional costs for tools are avoided. The particular design of the tongue-shaped holding means makes furthermore possible the mounting of additional connecting elements, for instance, for connecting a foot retaining hook as it is used, for instance, in bicycle racing. These hooks may, for instance, be passed through the hollow rivets.

It is, of course, to be understood that the present invention is, by no means, limited to sport pedals as shown in the drawings but may also be used in connection with other pedal designs, and that the invention also comprises any modifications within the scope of the appended claims.

What I claim is:

1. A bicycle pedal having its longitudinal sides provided with opening means for receiving holding means for reflector means, the location of said opening means being such with regard to the selected reflector means as to selectively permit mounting of said reflector means symmetrically and asymmetrically with regard to the transverse plane of symmetry of said pedal, having its longitudinal sides provided with bores, reflector means arranged between said bores, and holding means including means fastened in said bores and firmly engaging and holding said reflector means, said reflector means including at least two reflector bodies, and said holding means including rivet means interposed between two adjacent reflector bodies and riveted to said pedal, said rivet means having two tongues arranged opposite to each other and respectively engaging adjacent end portions of adjacent reflector bodies and firmly holding the same on said pedal.

2. A bicycle pedal according to claim 1, in which said bores are arranged along a line extending in the longitudinal direction of said pedal, and in which said reflector means include at least one longitudinal body having end faces narrower than the length of said longitudinal body.

3. A bicycle pedal according to claim 2, in which said holding means include rivet means extending through said bores and provided with tongue means firmly engaging at least portions of said end faces of said reflector means and firmly holding the same on said pedal.

4. A bicycle pedal according to claim 1, in which the longitudinal sides of said pedal are also provided with openings, and in which said reflector means include extensions engaging said openings.

5. A bicycle pedal according to claim 1, in which said holding means have resilient portions for engaging said reflector means.

6. A bicycle pedal according to claim 1, in which said holding means include means bent along said longitudinal sides of said pedal and engaging and holding adjacent end portions of said reflector means.

7. A bicycle pedal according to claim 1, in which said longitudinal sides of said pedal form U-shaped channels, and in which said reflector means are arranged within said channels.

8. A bicycle pedal comprising in combination a frame member having two side members provided with bores and perforations, two lateral portions spanning between the ends of the side members, a pedal axis and tubular frame portion adapted to receive said pedal axle connecting said lateral portions together, reflector means on said side members and holding means for fastening said reflector means on the side members, angularly projecting connecting elements formed out of the said lateral portions extending through the side members that engage the outer narrow sides of the reflector bodies and holding means connected to the side members, tongues that engage the narrow sides of the reflector bodies, said connecting elements being arranged in said bores and perforations provided in the side members thereby engaging the holding means and the reflector bodies firmly against the side members of said pedal to hinder lateral slippage and displacement of said reflector bodies.

9. A bicycle pedal in combination in accordance with claim 8, there being connecting elements formed out of the said lateral portions extending through the said side members and that engage the outer narrow sides of the reflector bodies and holding means provided with resilient tongues that engage the narrow sides of the reflector bodies and a tubular rivet shank formed integral with the holding means extending through and substantially filling said bores and perforations provided in the side members thereby engaging the holding means and the reflector bodies firmly against the side members of said pedal.

10. A bicycle pedal in combination in accordance with claim 8, there being at least two reflector bodies arranged longitudinally side by side on said side members and holding means and an integral formed tubular rivet shank interposed between two adjacent reflector bodies extending through and substantially filling said bores and perforations riveted to said side members, said holding means having two tongues arranged opposite to each other and respectively engaging adjacent reflector bodies and firmly holding the same on said side members of said pedal.

11. A bicycle pedal in combination in accordance with claim 8, said side member being provided with a U-shaped cross-section and said reflector means being arranged within the formed channel.

12. A bicycle in combination in accordance with claim 8, in which said reflector bodies have their back side provided with extensions for engagement with the bores and perforations that are provided in the side members.

* * * * *